United States Patent
Li et al.

(10) Patent No.: US 10,430,052 B2
(45) Date of Patent: Oct. 1, 2019

(54) METHOD AND SYSTEM FOR PROCESSING COMPOSITED IMAGES

(71) Applicant: FRAMY INC., Grand Cayman (KY)

(72) Inventors: Yu-Hsien Li, Taipei (TW);
Wen-Shiang Lin, New Taipei (TW);
Chen-Chou Lin, Taipei (TW)

(73) Assignee: FRAMY INC., Grand Cayman (KY)

( * ) Notice: Subject to any disclaimer, the term of this patent is extended or adjusted under 35 U.S.C. 154(b) by 645 days.

(21) Appl. No.: 15/004,121

(22) Filed: Jan. 22, 2016

(65) Prior Publication Data
US 2017/0139573 A1    May 18, 2017

(30) Foreign Application Priority Data
Nov. 18, 2015 (TW) .............................. 104138056 A

(51) Int. Cl.
*G06F 3/048* (2013.01)
*G06F 3/0484* (2013.01)
*G06T 11/60* (2006.01)
*G06F 3/0482* (2013.01)
*G06F 3/0488* (2013.01)
*G06T 11/00* (2006.01)

(52) U.S. Cl.
CPC ........ *G06F 3/04845* (2013.01); *G06F 3/0482* (2013.01); *G06F 3/04883* (2013.01); *G06T 11/00* (2013.01); *G06T 11/60* (2013.01); *G09G 2340/12* (2013.01)

(58) Field of Classification Search
CPC .......................................... G06F 3/0481–0489
See application file for complete search history.

(56) References Cited

U.S. PATENT DOCUMENTS 5,379,129 A * 1/1995 Othmer ................ H04N 1/3872
348/659
5,559,950 A * 9/1996 Cannon .................... G06T 13/00
345/501

(Continued)

FOREIGN PATENT DOCUMENTS

CA    2943108 A1 * 9/2015 ............. G06T 11/80
JP    2004234549 A    8/2004

(Continued)

*Primary Examiner* — Steven B Theriault
(74) *Attorney, Agent, or Firm* — Li & Cai Intellectual Property (USA) Office

(57) ABSTRACT

The disclosure is related to a method and a system for processing composited images. The method is operated in a computer. A software-enabled user interface is provided for a user to create a composited image using a touch screen. In the beginning, in response to the user's manipulation, at least two images are retrieved from a database. A background image and a foreground image are selected from the images. The user interface allows the user using a gesture over the background image displayed on the touch screen for generating a series of touch signals covering a specific area. The touch signals render a mask image. The mask is applied to the foreground image. The mask image of the background image covers the foreground image so as to create a new foreground image. The composited image is created when the new foreground image is composited with the background image.

8 Claims, 13 Drawing Sheets

(56) References Cited

U.S. PATENT DOCUMENTS

| | | | | |
|---|---|---|---|---|
| 5,732,230 | A * | 3/1998 | Cullen | G06T 11/00 345/629 |
| 5,852,673 | A * | 12/1998 | Young | G06T 11/001 382/164 |
| 6,028,583 | A * | 2/2000 | Hamburg | G06T 15/503 345/589 |
| 6,031,532 | A * | 2/2000 | Gourdol | G06F 3/04817 345/629 |
| 6,222,637 | B1 * | 4/2001 | Ito | G06T 11/60 358/1.16 |
| 6,597,367 | B2 * | 7/2003 | Geisler | B60K 35/00 345/629 |
| 6,734,873 | B1 * | 5/2004 | Herf | G06T 15/40 345/538 |
| 6,803,923 | B1 * | 10/2004 | Hamburg | G06T 15/503 345/629 |
| 6,891,533 | B1 * | 5/2005 | Alcorn | G06T 15/005 345/419 |
| 7,042,467 | B1 * | 5/2006 | Hamburg | G06T 15/503 345/592 |
| 7,088,375 | B1 * | 8/2006 | Hamburg | G06T 11/00 345/626 |
| 7,095,905 | B1 * | 8/2006 | Peterson | G06F 3/4038 348/36 |
| 7,113,183 | B1 * | 9/2006 | Collins | G06T 15/405 345/419 |
| 7,136,075 | B1 * | 11/2006 | Hamburg | G06T 11/60 345/592 |
| 7,227,553 | B2 * | 6/2007 | Wang | G06T 11/60 345/589 |
| 7,559,034 | B1 * | 7/2009 | Paperny | G06F 9/44526 345/629 |
| 7,889,205 | B1 * | 2/2011 | Parenteau | G09G 5/393 345/545 |
| 8,406,566 | B1 * | 3/2013 | Wilensky | G06T 11/60 382/173 |
| 8,831,382 | B2 * | 9/2014 | Tolstaya | H04N 1/3876 382/278 |
| 8,847,922 | B1 * | 9/2014 | Kurtz | G06F 3/0416 345/175 |
| 8,970,601 | B1 * | 3/2015 | Orbach | G06T 13/80 345/473 |
| 9,208,819 | B1 * | 12/2015 | Gregg | G11B 27/034 |
| 2001/0055414 | A1 * | 12/2001 | Thieme | G06T 11/60 382/135 |
| 2002/0015161 | A1 * | 2/2002 | Haneda | G06Q 20/209 358/1.2 |
| 2002/0181802 | A1 * | 12/2002 | Peterson | G06T 3/005 382/284 |
| 2003/0184815 | A1 * | 10/2003 | Shiki | G06T 11/60 358/453 |
| 2004/0125109 | A1 * | 7/2004 | Fery | G06T 17/10 345/473 |
| 2005/0053310 | A1 * | 3/2005 | Myochin | G06T 11/60 382/284 |
| 2007/0035543 | A1 * | 2/2007 | David | G06F 9/451 345/420 |
| 2007/0201744 | A1 * | 8/2007 | Sanami | H04N 1/3872 382/173 |
| 2007/0252831 | A1 * | 11/2007 | Lind | G06T 11/60 345/419 |
| 2008/0036789 | A1 * | 2/2008 | de Leon | H04N 1/00183 345/625 |
| 2010/0007675 | A1 * | 1/2010 | Kang | G06F 3/04883 345/592 |
| 2010/0045698 | A1 * | 2/2010 | Shields | G06F 19/321 345/629 |
| 2011/0018901 | A1 * | 1/2011 | Boorman | G06T 1/00 345/629 |
| 2011/0287811 | A1 * | 11/2011 | Mattila | G06K 9/4671 455/566 |
| 2012/0002898 | A1 * | 1/2012 | Cote | G06T 5/50 382/278 |
| 2012/0051631 | A1 * | 3/2012 | Nguyen | G06K 9/38 382/164 |
| 2012/0092357 | A1 * | 4/2012 | Wang | G06T 11/001 345/581 |
| 2012/0188255 | A1 | 7/2012 | Brunner et al. | |
| 2012/0306904 | A1 * | 12/2012 | Francois | A63F 13/213 345/589 |
| 2013/0050527 | A1 * | 2/2013 | Nakajima | H04N 9/8047 348/231.99 |
| 2013/0177209 | A1 * | 7/2013 | Baik | G06K 9/18 382/103 |
| 2013/0222647 | A1 | 8/2013 | Ishihara et al. | |
| 2013/0329002 | A1 * | 12/2013 | Tico | G06T 3/4038 348/36 |
| 2014/0269930 | A1 * | 9/2014 | Robinson | H04N 21/2365 375/240.24 |
| 2014/0321703 | A1 * | 10/2014 | Inomata | G06K 9/00624 382/103 |
| 2015/0286333 | A1 * | 10/2015 | Shey | G06T 11/001 345/173 |
| 2016/0093071 | A1 * | 3/2016 | Miki | G09G 5/14 345/589 |
| 2016/0286122 | A1 * | 9/2016 | Snavely | H04N 5/23238 |
| 2017/0076476 | A1 * | 3/2017 | Nakajo | H04N 1/387 |

FOREIGN PATENT DOCUMENTS

| | | |
|---|---|---|
| JP | 2013008297 A | 1/2013 |
| TW | 201210328 A | 3/2012 |
| TW | 201222469 A1 | 6/2012 |
| WO | WO 9525399 A1 | 9/1995 |

* cited by examiner

METHOD AND SYSTEM FOR PROCESSING COMPOSITED IMAGES

BACKGROUND OF THE INVENTION

1. Field of the Invention

The present invention is generally related to a method and a system of image processing, in particular to the method for processing the composited images including animation, and the method for performing the method.

2. Description of Related Art

When a user manipulates a sticker image attached to a background image in a computer device, one sticker image is chosen to be stuck to a background that is first selected. Then a location is chosen to place the sticker image. After that sticker image is combined with the background image, and a new image having the sticker image is created.

When the user wants a portion of the foreground image to be hidden behind a specific area or an object of the background image, a cutting tool in a software program is used to cut the foreground image according to the pattern of the portion to be hidden. A visual effect of putting the portion of the foreground image behind the background image is rendered when the cut foreground image is pasted to the background image.

FIGS. 9A to 9C show an exemplary method to apply the sticker to an image in the conventional technology.

In 9A, a second image 902, e.g. a background image, is provided. A first image 901 used to be the foreground sticker image is also provided. Rather than directly pasting the sticker image onto the second image 902, when the user uses a portion of the first image 901 to be hidden behind a specific area of the second image 902, such as the example shown in FIG. 9B, the first image 901 is cut using a software program according to the hiding location. The cut first image 901' is therefore formed, and a combined image shown in FIG. 9C is created.

SUMMARY OF THE INVENTION

In view of the conventional technology for cutting and placing a sticker image in a background image by using a cut tool to form the sticking foreground image rather than keeping the original foreground image, the present invention disclosure herein is related to a method and a system provided to form a composited image that can be kept as an original for more applications. In other words, the foreground image after being cut in the conventional technology may not easily be applicable to other applications since the original foreground image has been modified.

In one embodiment of the present invention, the main steps in the method include first acquiring at least two images from a database, in which a first image and a second image are set in the beginning. Via a user interface, a mask covering a specific area is set in the first image and formed as a third image. A composited image is therefore created by combining the first image, the second image, and the third image.

In one further embodiment in the disclosure, the method for processing composited images is to acquire at least two images from a memory of the computer system, and to set one of the images as a background image and one another to be a foreground image. The images can be buffered to the memory of the computer system. The computer system is such as a computer with a touch screen. The background image is displayed on the touch screen. The touch screen allows a user to generate touch signals of an area over the touch screen using a gesture. The touch signals can be processed to form a mask image that is also buffered to the memory. This mask image is taken from the background image, however the mask image being used to indicate the range of the mask is temporarily existed in the memory. When the mask image is applied to the foreground image, the area of the background image acting as the mask covers a portion of the foreground image, so as to form a new foreground image. The new foreground image is then buffered to the memory. A composited image is afterward created by combining the new foreground image and the background image.

In another embodiment, the background image can be a static image or an animation in which at least one object is provided. The foreground image can be an animation which is kept in the original form when it is combined with the background image through the above-mentioned steps.

In one further embodiment of the present invention, under the aforementioned masking mechanism, the foreground image is a static image or an animation which is adjustable as to the image's position, size, and/or its orientation.

In one further aspect of the present invention, disclosure is related to a system for processing composited images. The system includes a processor and a memory, and an instruction set is configured to be stored in the memory. The instructions are executed by the processor include instruction for acquiring at least two images from the computer system; instruction for setting a first image and a second image from the at least two images; instruction for configuring at least one mask covering at least one area of the first image using a user interface; instruction for forming a third image indicative of the at least one mask; and instruction for combining the first image and the second image, as applying the at least one image for forming a composited image.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The disclosure of the present invention is related to a method and a system of image processing. The system allows a user to handle the composited images including animation through a user interface. In particular, when the user wants to create a visual effect that a part of sticker image is hidden behind some objects in a background image through masks, the sticker image is still kept in the original form. Furthermore, under an aspect of the present invention, the sticker image acts as a foreground picture that can be an animation. The system allows the user freely to change the size and/or orientation of the foreground image by means of the mechanism of successive image processing. The final composited image reveals a visual effect of hiding a portion of sticker behind some background objects at any time.

Figure 1:
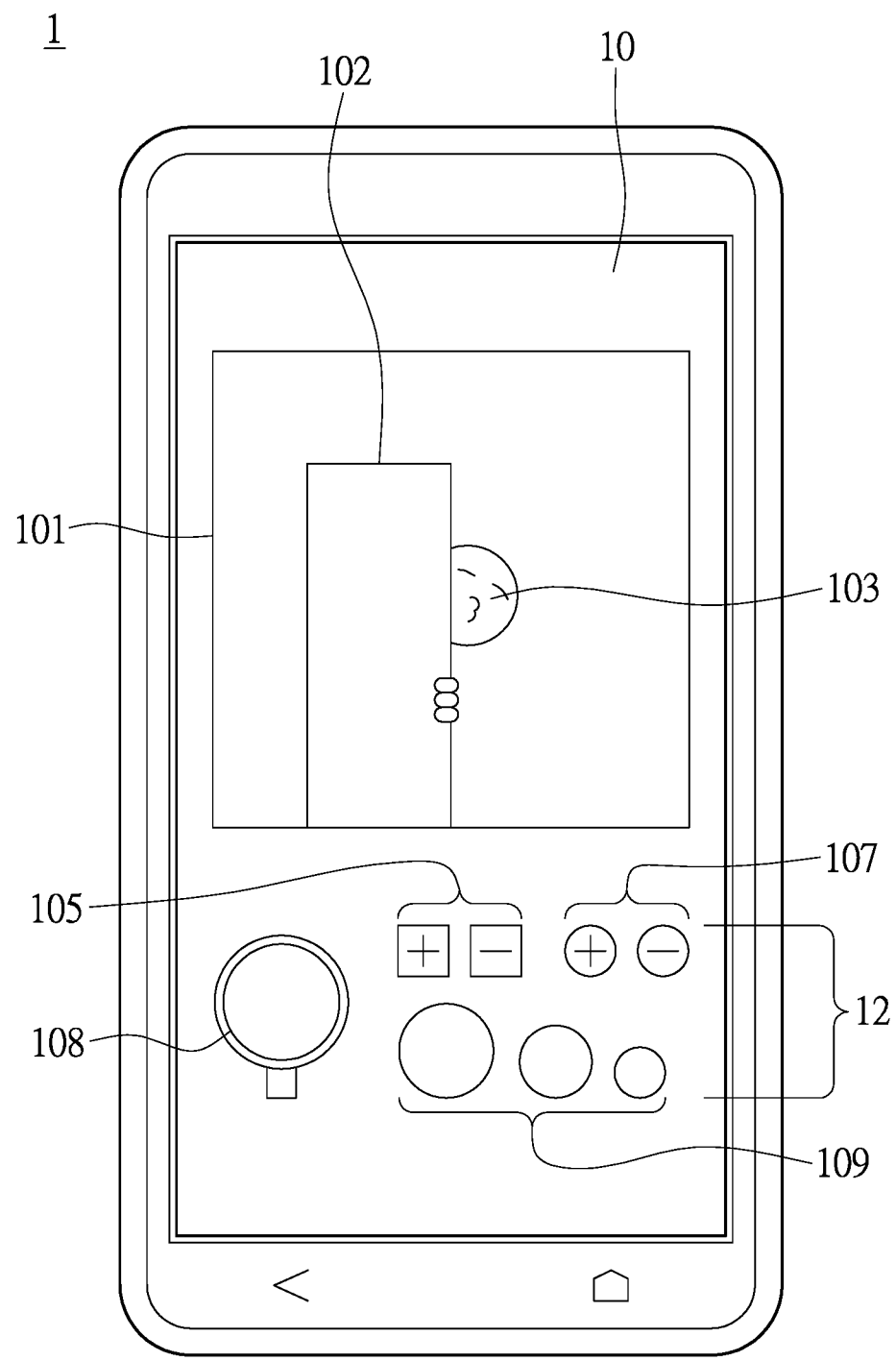
FIG. 1 shows a diagram illustrating the operation for processing composited images in one embodiment in accordance with the present invention.

According to one embodiment of a system for conducting the method for processing composited images, the system is applied to a computer device. The system renders an operating screen that is referred to the schematic diagram shown in FIG. 1 merely depicts the exemplary operations of the method rather than the practical implementation.

A computer system 1 is shown in the diagram. The system 1 includes the legacy input devices such as a computer mouse and a keyboard. In addition, the system 1 is such as a computer device equipped with a touch screen 10. The touch screen 10 renders a user interface allowing the user to operate the method for processing composited images in accordance with the present invention. The user interface may indicate a software-enabled graphical user interface (GUI) initiated by the touch screen.

In the method for processing composited images, a background image 10 is introduced. The background image 101 is such as, but not limited to, an image of a combination of colors and patterns, a scenic image, or a picture. The background image may be a static image, or a series of animation frames. Further, the background image 101 may also be included with a kind of background object 102 such as, but not limited to, a scenic object, people, a building, or merely a picture.

A foreground object 103 being an image is introduced. The technology allows the user freely to adjust this image's position, size, and/or orientation. Further, the foreground object 103 is such a static image or an animation. In the present instance, the foreground object 103 is a sticker attached to the background image 101. In accordance with the present invention, the method for processing composited images is to reveal the sticker hidden behind the background object 102 of the background image 101. Rather than requiring that the sticker be re-trimmed according to the conventional technology when the position, size, and/or orientation have been changed, the method of the present invention allows the user freely to adjust position, size, and/or orientation of the sticker.

The diagram shows a user interface initiated on a touch screen 10. The user interface renders an operating zone 12 preparing various graphics-editing tools that allow the user to create a composited image. The user uses a selection tool to set a background image and a foreground image through the touch screen 10. Then a mask range is defined over the background image using one of the tools. In an exemplary embodiment, an image setting tool 105 is provided for the user to select a background (101, 102) and a foreground image (103); a mask setting tool 107 is provided for the user to change the position(s) and a number of the mask(s); a magnification editing tool 108 allows the user to easily tune the subtleties of the image; and further a touch setting tool 109 that allows the user to control the size of area where the finger touches the touch screen 10. In operation, the user performs gesture to control the size of the fingertip over the touch screen 10 in order to control the coverage of area where the finger touches over the touch screen 10. For the purpose of setting a mask over the background image 101, the touch setting tool 109 allows the user to control the coverage of area the fingertip touches on the touch screen 10. Still further, the touch setting tool 109 is also the tool for the user to control the size of finger-drawing over the touch screen 10.

After setting the mask over a specific area of the background image 101 through the method for processing composited images, it appears as a visual effect of hiding a portion of the foreground object 103 behind the background object 102. It is noted that the mechanism incorporating the mask set over the background image according to the present invention is different from the conventional technology that cuts off a portion of the foreground, e.g. the sticker, for fitting for a specific background object.

In accordance with the present invention, the mask set over the background object 102 is used to hide the corresponding portion of the foreground object 103 by combining the foreground object 103 and the background image 101. The diagram shows the visual effect of hiding a portion of the foreground object 103 behind the background object 102. The method of the present invention keeps the foreground object 103 as original and allows the user freely to adjust the position, size, and angle of the foreground object 103. Through this mechanism, only the portion covered by the mask will be hidden behind the background object 103 because the method does not modify the original foreground object 103. The final composited image is created by combining the foreground object 103 and the background image 101 having the background object 102. The composited image shows the foreground object 103 being hidden behind the mask.

Figure 2A:
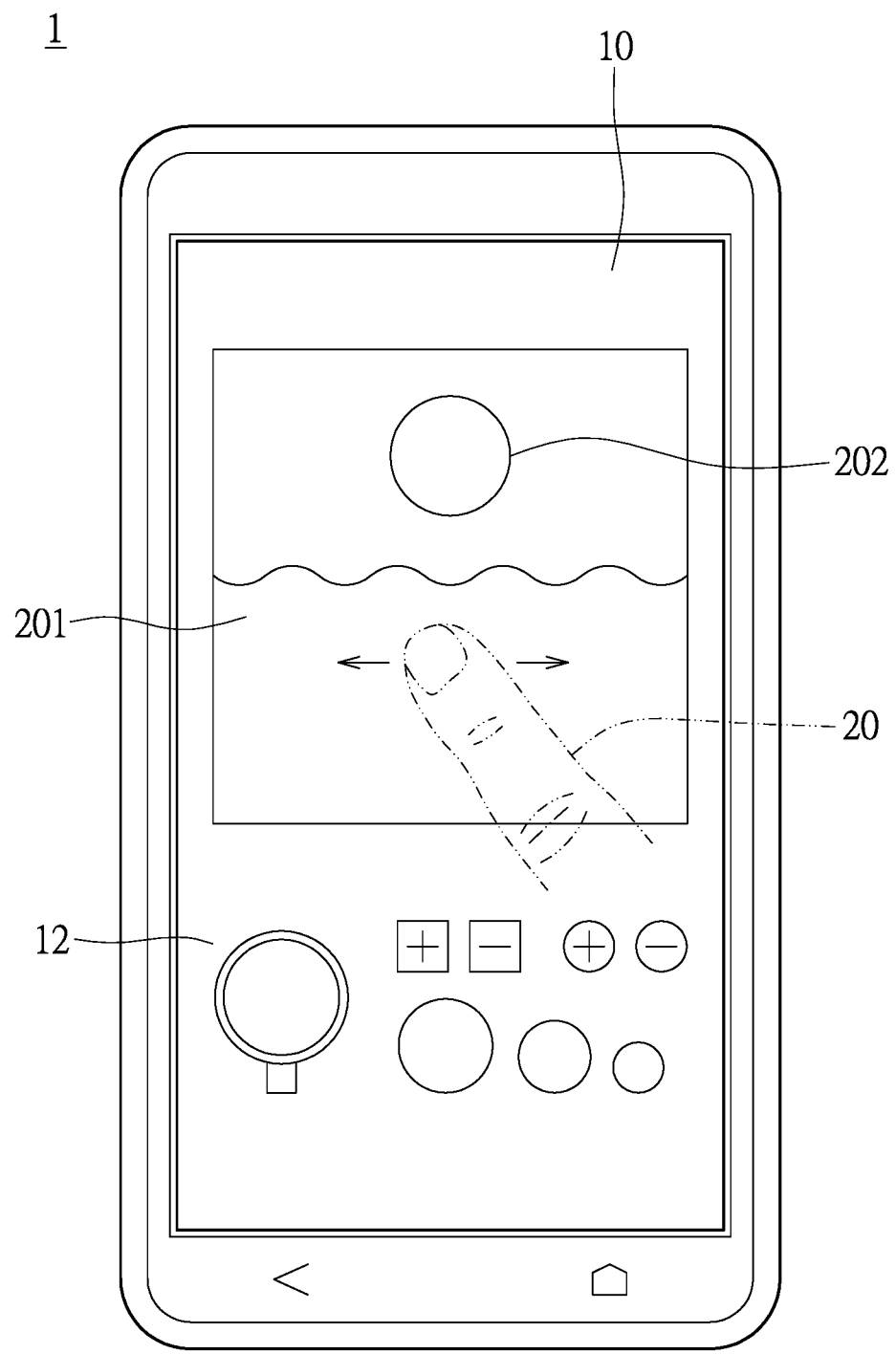
FIG. 2A through FIG. 2C shows the exemplary example describing the method for generating the a composited image using a touch screen in one embodiment of the present invention.
Figure 2B:
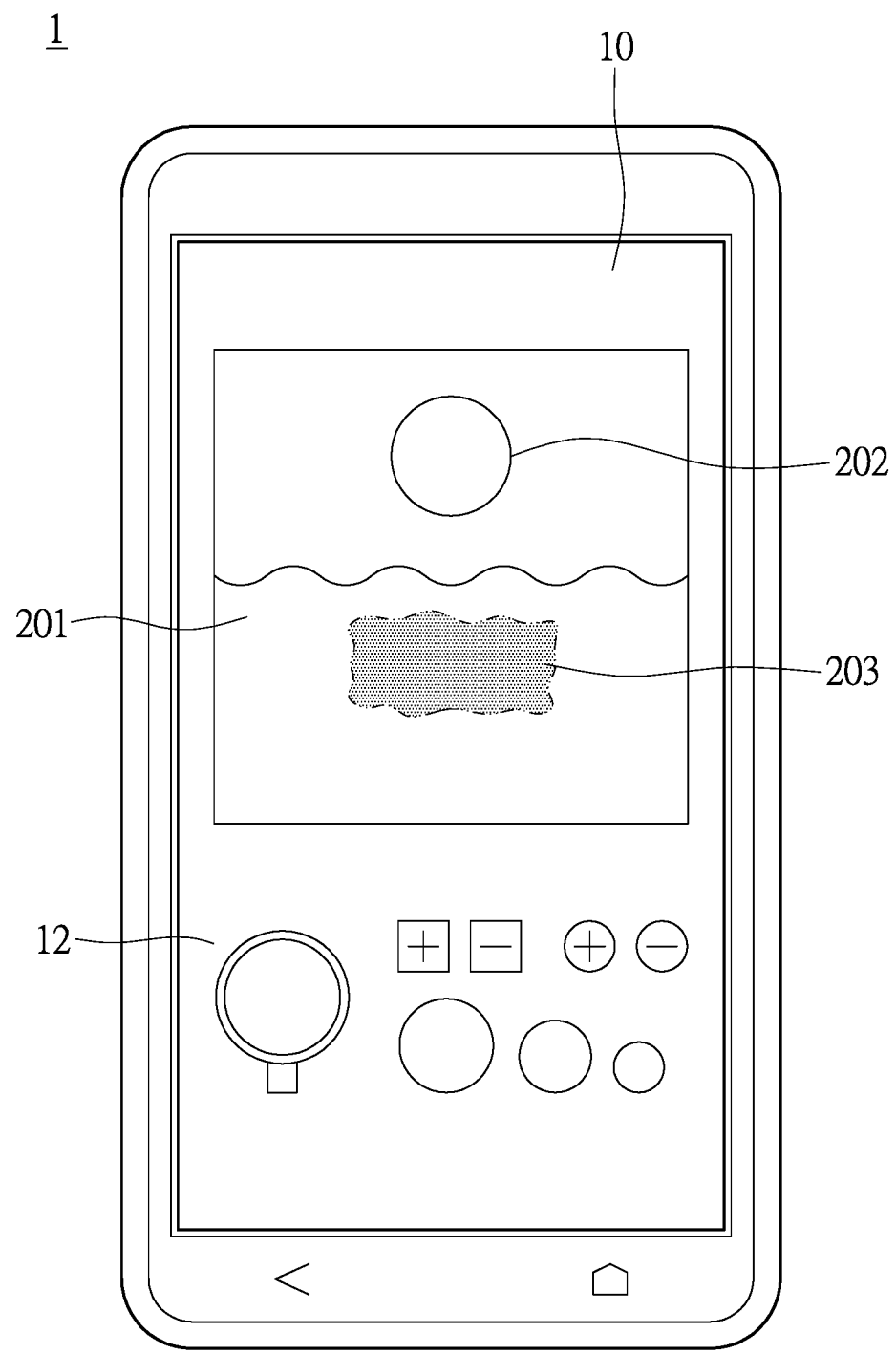
Figure 2C:
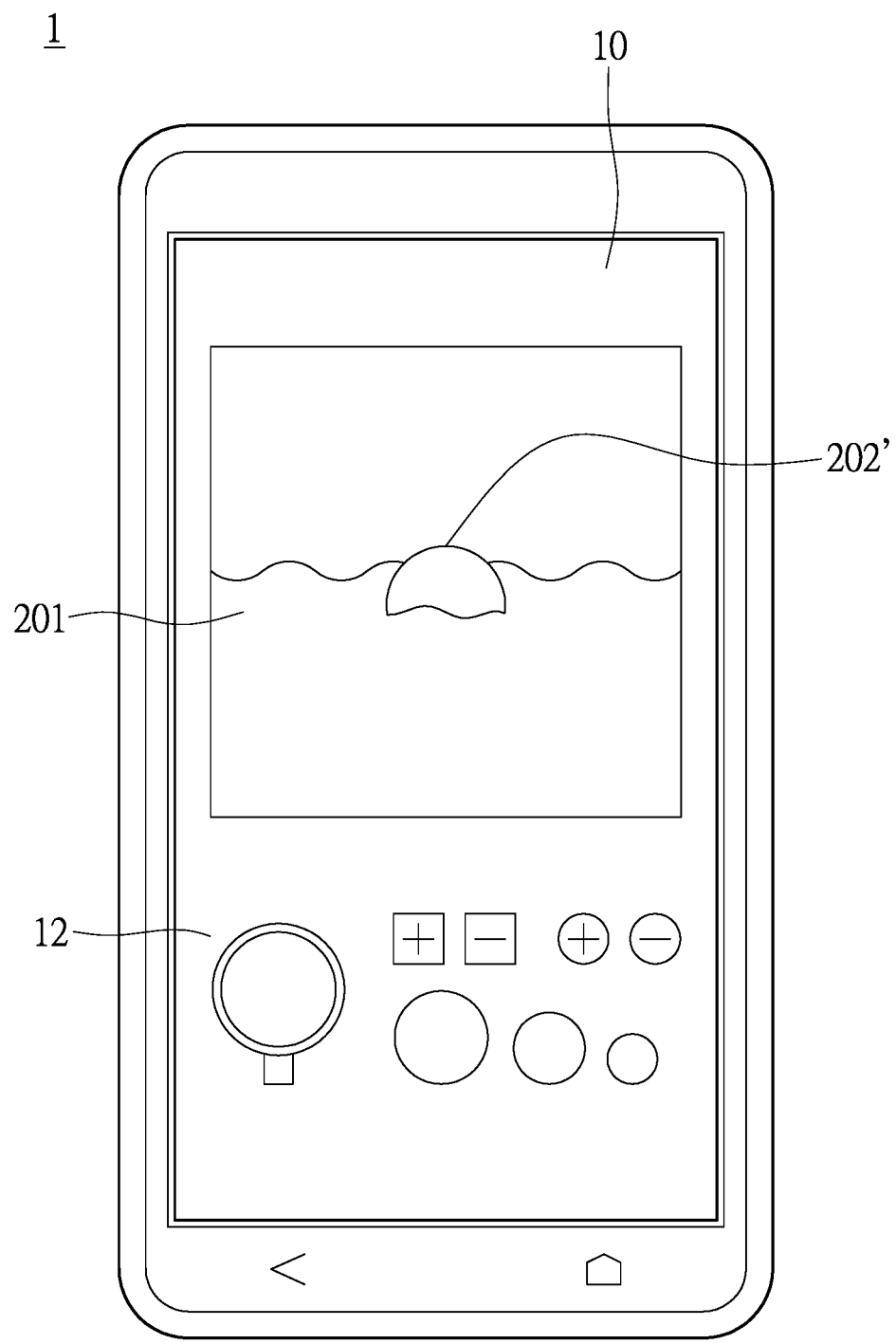

FIGS. 2A through 2C describe the production of the composited image onto the touch screen by the method for processing composited images according to one embodiment of the present invention.

In FIG. 2A, the computer system 1 having the touch screen 10 is shown. A software-implemented operating zone 12 is provided. A background image 201 and a foreground object 202 are displayed on the touch screen 10. The operating zone 12 allows the user to perform a gesture to render a mask. The schematic diagram shows the user's finger 20 slips over an area of the background image 201, and the software program executed in the computer system 1 receives a series of touch signals from the area. The touch signals are with respect to an image region. This region forms a mask image acting as the mask, and the mask image being temporarily existed in the memory is used to indicate the range of the mask. It is noted that the mask can be formed by other methods not only the aforementioned approach. For example, the software allows the user to configure the mask using a stylus to paint the region, or select the region with a frame.

In an exemplary example, a user interface is introduced for the user to perform a gesture upon the background image displayed on the touch screen 10. The user performs the gesture to wipe the area along the contour of a specific object of the background image 201 by his fingertip. The wiping action forms the corresponding touch signals over the touch screen 10. The touch signals are generated in response to the wiping operation.

Reference is next made to FIG. 2B. The area wiped over the touch screen 10 renders the corresponding touch signals in the computer system 1. The touch signals with respect to the area form a mask image 203 that is marked by a twill pattern.

FIG. 2C schematically shows a portion of a foreground object 202 is hidden behind the region overlapped by the mask image 203 shown in FIG. 2B in the background image 201 when the foreground object 202 is moved to the position of the mask image 203. It is noted that the mask image 203 is temporarily stored in the memory and used to indicate the range of the mask. The mask hides the region of the foreground object 202 overlapping the mask image 203 and reveals the corresponding portion of the background image 201. The final image forms a masked foreground object 202'. It is worth noting that the technology allows the user freely to adjust the position, size, and/or orientation of the foreground object 202 by combining the images. Finally, a composited image can be created when the user decides the final arrangement of combining the background image 201 and the masked foreground object 202' is completed. The temporary images, e.g. the masked foreground object 202' applying the mask image, generated during the adjustment may be buffered in the memory of the computer system 1.

FIGS. 3A through 3D schematically describe the process to create the composited image in accordance with the present invention.

Figure 3A:
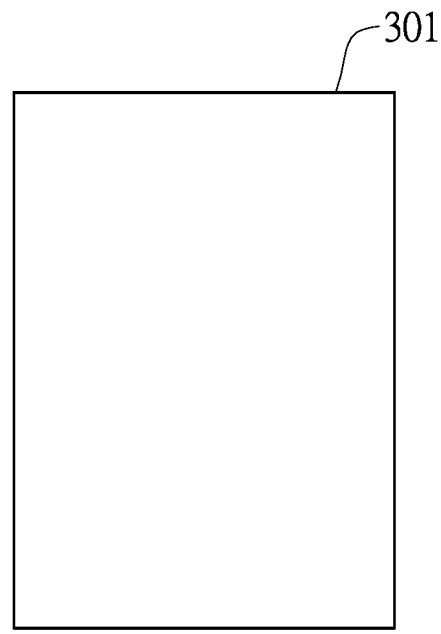
FIG. 3A through FIG. 3D schematically show a series of steps for processing composited images in accordance with the present invention.
Figure 3B:
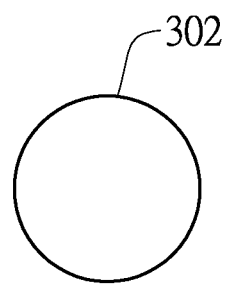
Figure 3C:
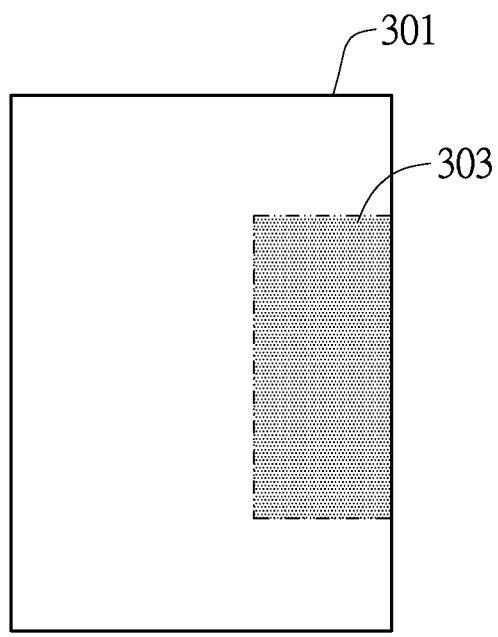

FIG. 3A shows a schematic diagram depicting a first image 301. The first image 301 is such as the foregoing background image or background object. FIG. 3B shows a schematic diagram of a second image 302. The second image 302 acts as the foreground object or a sticker. FIG. 3C shows another schematic diagram describing a third image 303, e.g. the mask image, which is used to be the mask over the first image 301.

Figure 3D:
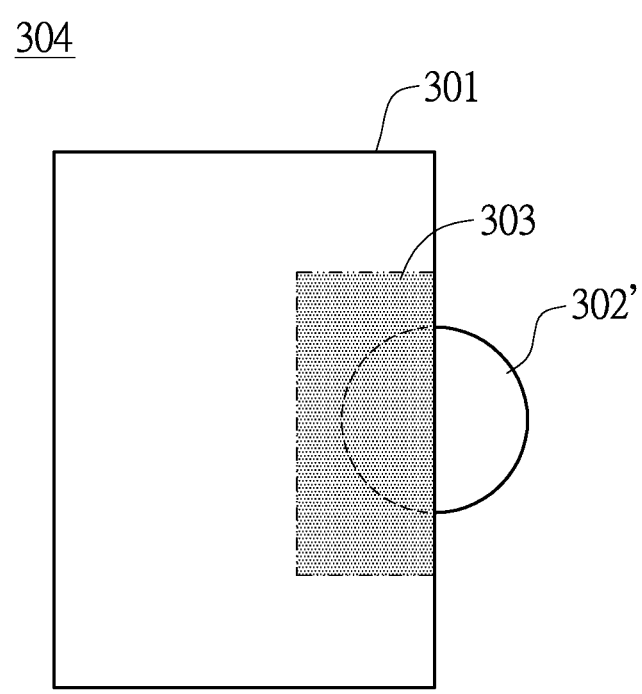

FIG. 3D shows the final composited image 304. When the user moves the second image 302 into the coverage of the third image 303, the overlapped portion between the second image 302 and the third 303 is masked. It appears that a masked second image 302' is formed since part of second image 302 is masked by the mask image set in the first image 301, and the remaining portion of the second image 302 is unmasked. A composited image 304 is created by combining the first image 301 and the masked second image 302'. It is noted that the mentioned masked second image 302' means at least a proportion of the area of the original second image 302 is masked.

FIGS. 4A through 4D exemplarily depict steps for setting multiple masks in the method for processing composited images in one embodiment of the present invention.

Figure 4A:
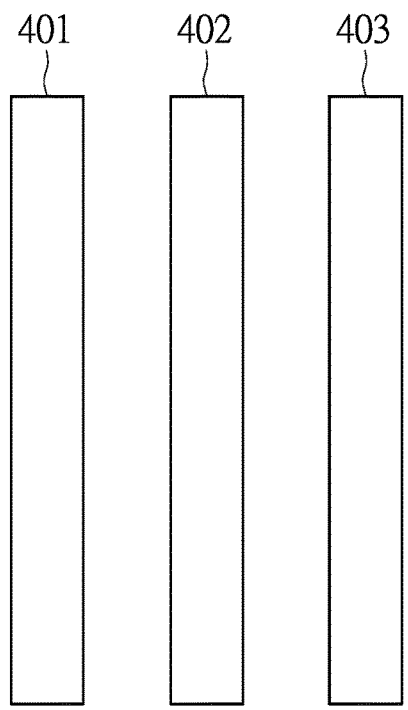
FIG. 4A through FIG. 4D schematically show a series of steps for processing composited images in another embodiment of the present invention.
Figure 4B:
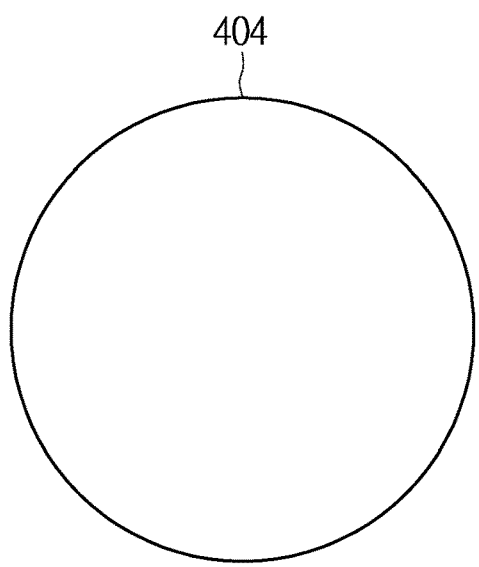

Three background objects of the background image are shown in FIG. 4A. The background objects are labeled as a first background object 401, a second background object 402, and a third background object 403. In FIG. 4B, a foreground object 404 is provided for the user to adjust its position, size and orientation or angle thereof.

Figure 4C:
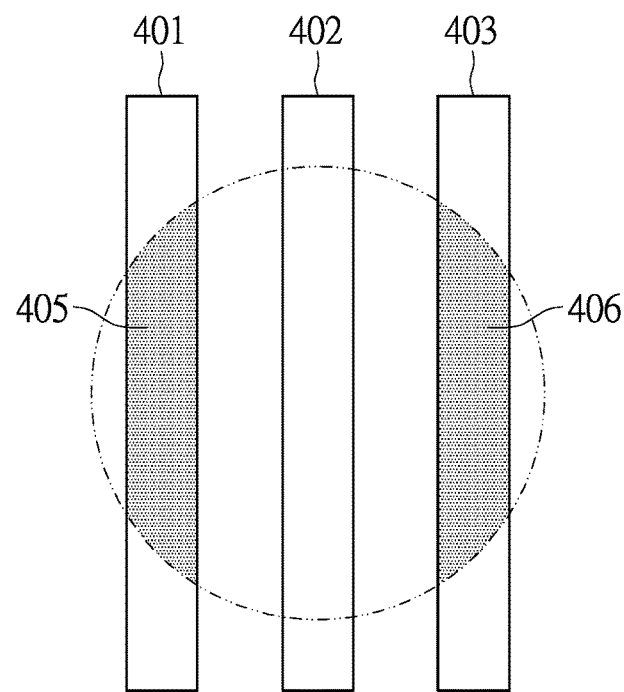

The method allows the user to configure multiple masks for predetermined patterns. The user is allowed freely to set one or more mask images upon the background image to cover the second image (302) so as to form the masked second image (302'). The masked second image 302' is depicted by multiple masked regions. In FIG. 4C, a first mask image 405 is formed over a first background object 401. A software tool is provided for the user to perform gesture or other means for selecting a graphic block to define the mask region. In the present example, another mask is formed over the third background object 403. A second mask image 406 is produced by configuring the corresponding mask.

It is noted that the mask images (405, 406) are temporarily stored to a memory in operation of the system. The mask images are presented on a display screen for the user to view and confirm the formation of images.

Figure 4D:
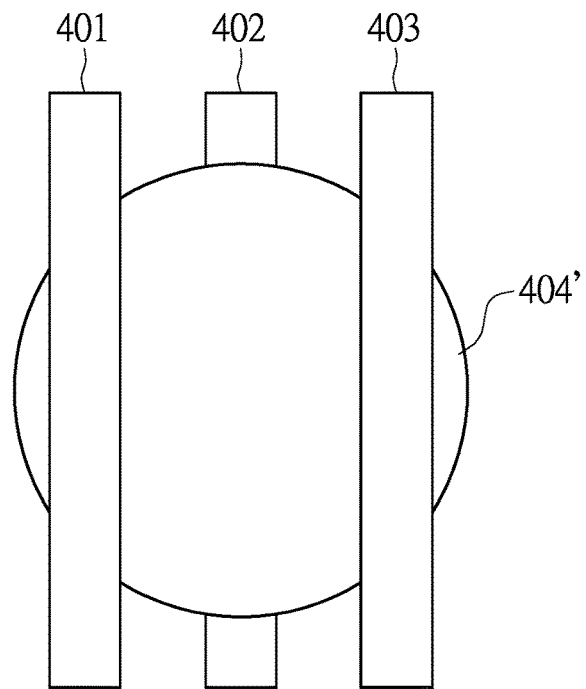

In FIG. 4D, a foreground object 404 is moved to in between the first background object 401, the second background object 402, and the third background object 403. A new image is created when the mask images 405, 406 and the foreground object 404 are combined, and the new image is temporarily stored to the memory. After the user confirms the final position of the foreground object 404, a masked foreground object 404' is formed by combining with the background image. It reveals the visual effect that the regions covered by the masks are hidden.

Under the mechanism in the method for processing composited images in accordance with present invention, the foreground image or any object in the method can be an animation that can still be hidden behind a background object for revealing a specific visual effect. Reference is made to the schematic diagrams shown in FIGS. 5A to 5D.

Figure 5A:
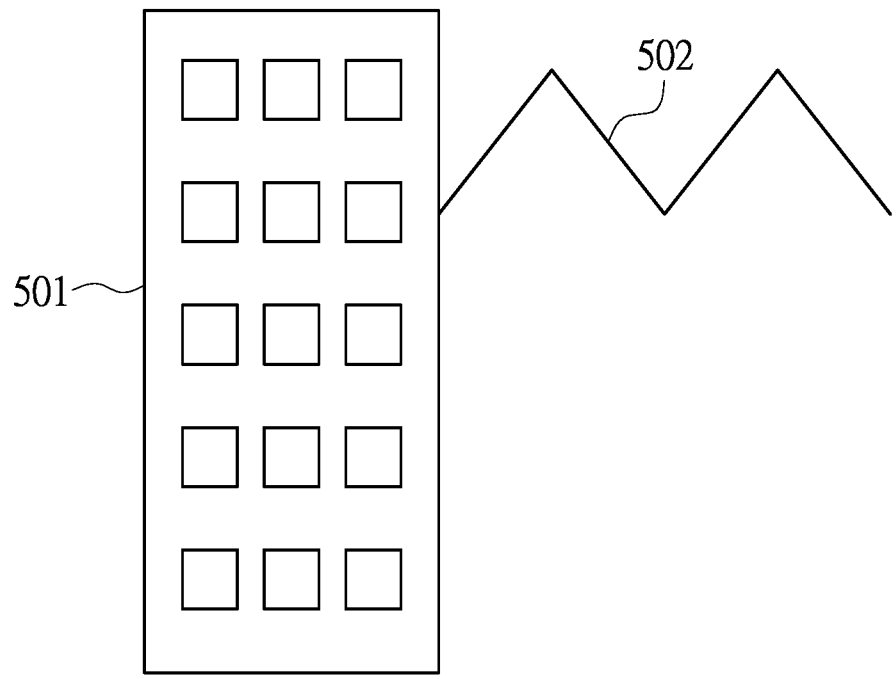
FIG. 5A through FIG. 5D show the diagrams for illustrating the effect using multiple masks applied to the picture in the method for processing composited images of the present invention.
Figure 5B:
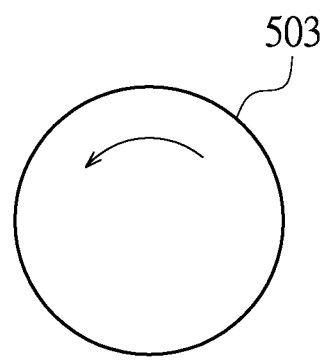

The background image shown in FIG. 5A includes at least two background objects configured to be a first background object 501, e.g. a building, and a second background object 502, e.g. a distant mountain. A foreground image 503 such as a moon is shown in FIG. 5B. It is noted that an arc arrow shown within the moon indicates that this foreground image 503 is an animation with cyclic change.

Figure 5C:
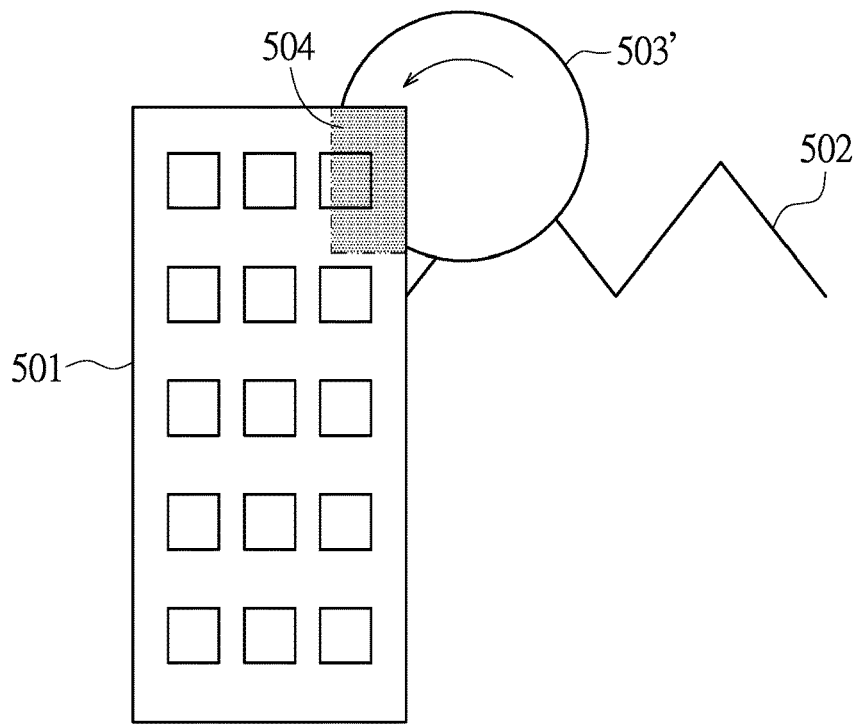

In FIG. 5C, a user interface allows the user to set a first mask, e.g. the temporarily-stored first mask image 504, somewhere in the first background object 501. The first mask image 504 is formed corresponding to a region where it has been predetermined to hide the portion of the foreground image 503 behind the first background object 501. When the first mask is applied to the foreground image 503, a masked foreground image 503' showing the foreground image 503 covered by part of the first background object 501 is revealed. It is noted that the aspect of the present invention allows the foreground image 503 to be kept as the original form. The figure shows part of the moon is hidden from view behind the building. It is noted that a second background object 502 has not yet acted as any mask at this phase.

Figure 5D:
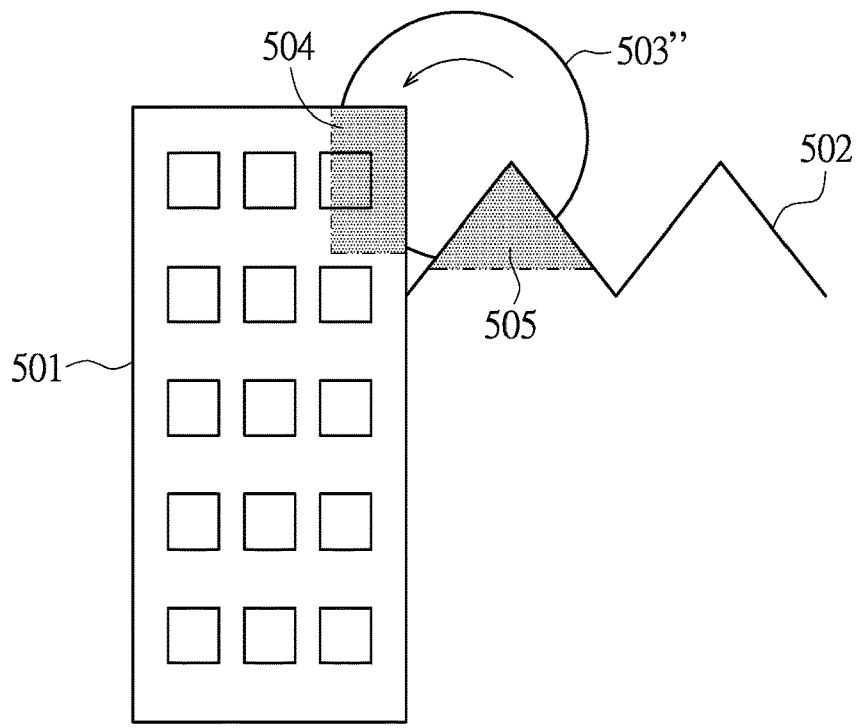

The second background object 502 is shown in FIG. 5D. A second mask is set as configured to be the second mask image 505 is formed over the second background object 502. Both the first mask (504) and the second mask (505) cause the foreground image 503' to be masked by both the first background object 501 and the second background object 502. The first mask (504) and the second mask (505) are applied to the foreground image 503' so as to create an image, e.g. the masked foreground image 503", which is temporarily stored in the memory. However, the foreground image 503 is still kept as the original form at this phrase. It is noted that the mask images (504, 505) are temporarily stored in the memory, and used to indicate the ranges occupied by the masks; the combination of the images are regarded as applying the masks (504, 505) to the foreground image 503 which is stuck to the background image. After confirming the position of the foreground image 503' behind the background object 502, the masked foreground image 503" is formed. A final composited image with an animated foreground image is therefore created.

Figure 6:
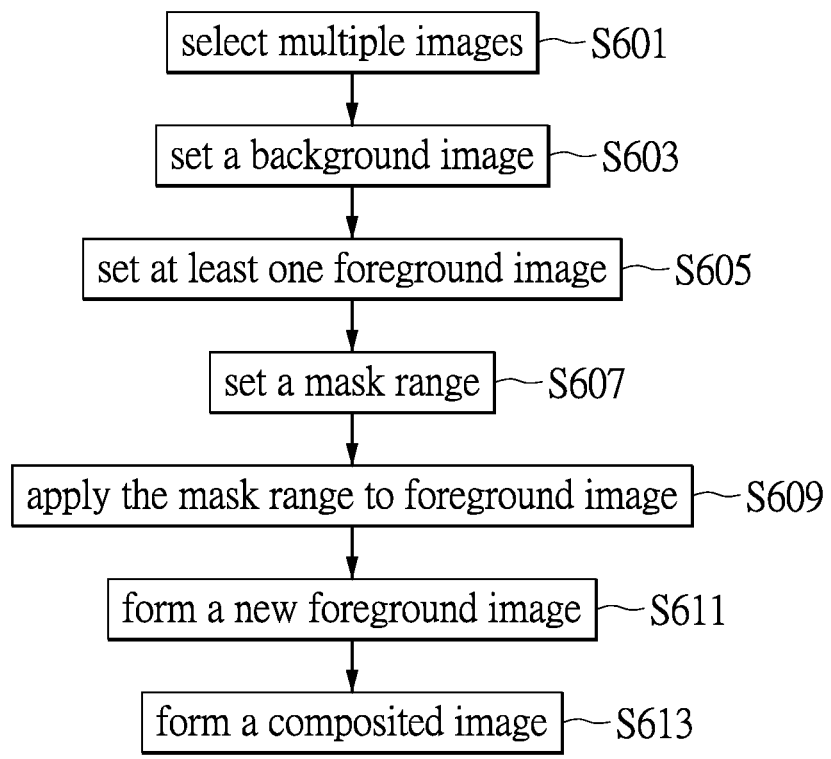
FIG. 6 shows a flow chart depicting the method for processing composited images according to one embodiment of the present invention.

FIG. 6 shows a flow chart depicting the method for processing composited images in one embodiment of the present invention. The method for processing composited images may be applied to a computer system that may be a computer device or a mobile device. A software program renders an operating environment for the user to make a selection of image(s) and set the mask.

Figure 8:
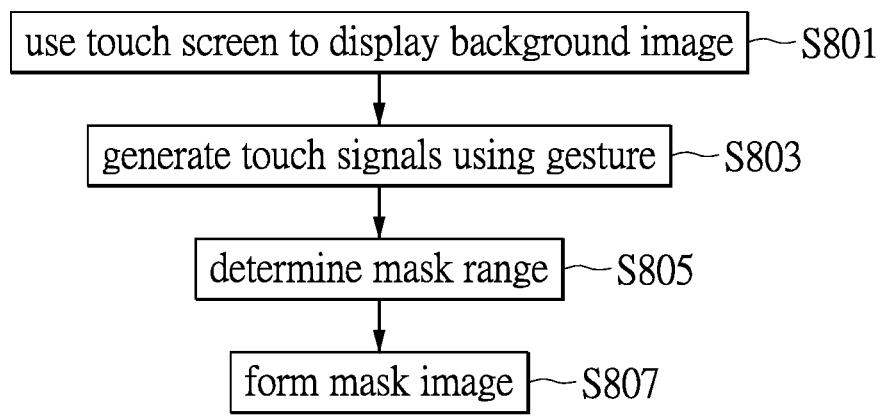
FIG. 8 shows a flow chart depicting the method for processing composited images according to one more embodiment of the present invention.
Figure 9A:
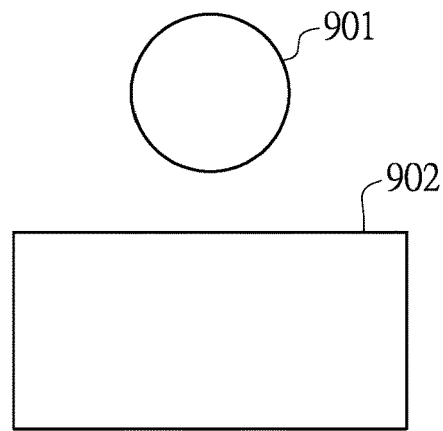
FIG. 9A through FIG. 9C schematically show the operation using the conventional sticker.
Figure 9B:
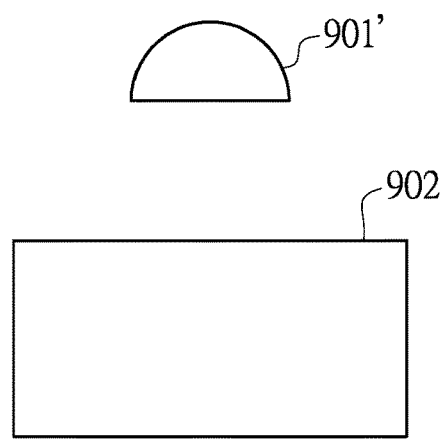
Figure 9C:
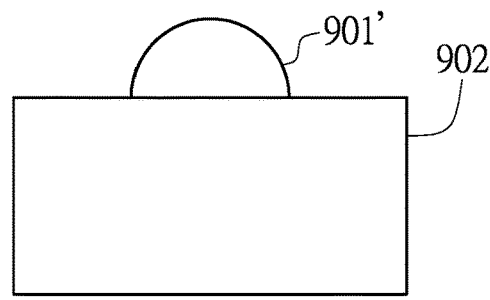

In the beginning of the method, such as step S601, multiple images can be selected from a database, or taken by an instant photographing. The instant photographs can be temporarily stored to a memory of the computer system. It is not excluded that the memory for storing the images can be the other types of storing medium. After that, a background image is set from the multiple images, such as step S603; and at least one foreground image is also selected, such as step S605. A user interface is provided for the user to set a mask range over the background image, such as step S607. FIG. 8 depicts the flow to set the mask. Other alternative methods may also be used to select the mask range. The number of the masks may not be limited to any specific number, and therefore the foreground image may have multiple regions masked by the background image.

After that, such as step S609, a software program is used to apply the mask(s) to the foreground image. The mask image set from the background image allows the area of the mask to cover an overlapping area between the foreground image and mask image. A new foreground image is formed after redrawing the screen, such as step S611. The software program may allow the foreground image can be instantly applying the mask image. Before the masked foreground image is located, the new foreground image is formed instantly. The new foreground image is buffered to the memory. At last, such as step S613, the foreground image may be animation that allows the user free to adjust the image's position, size, and/or orientation, so as to form a composited image.

Figure 7:
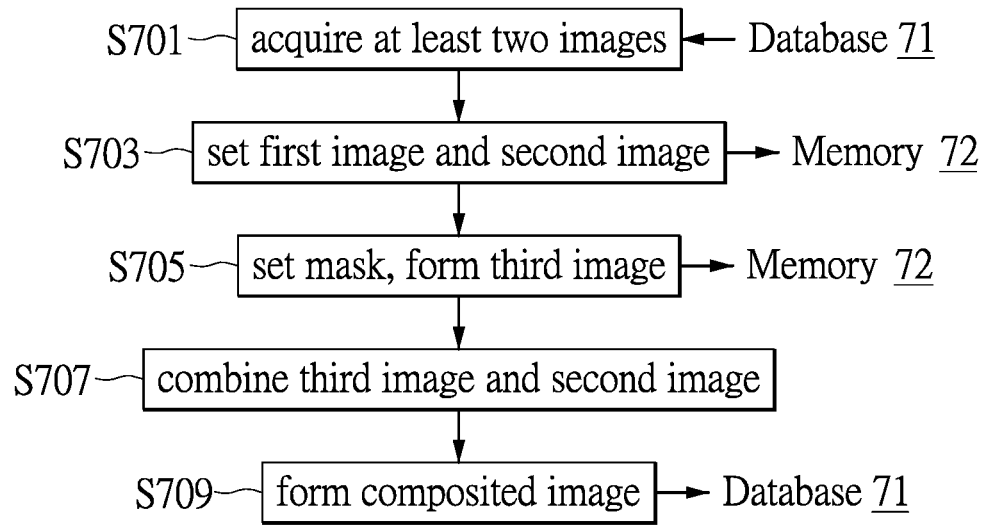
FIG. 7 shows a flow chart depicting the method for processing composited images according to one further embodiment of the present invention.

Further reference is made to FIG. 7 showing a flow chart depicting the method in another embodiment of the present invention. This flow shows the embodiment that is not necessary to distinguish the foreground and the background but adapted to the picture including various image objects.

First, in step S701, at least two images are retrieved from a database 71. In response to the user's preference a first image and a second image are selected, such as in step S703. The selected images are temporarily stored in a memory 72 of the system. In user interface is provided for the user to set a mask over the selected image(s). For example, a mask is formed over the first image. The range of the mask over the first image forms a third image, such as in step S705. This third image is also buffered to the memory 72. In one aspect of the present invention, a computer system retrieves the first image, the second image, and the third image from the memory 72. These images are combined so as to form a composited image.

The current process shows the combination of the second image and the third image retrieved from the memory 72, such as step S707. In the process of the combination using the software program, the software program instructs layer-by-layer combination as applying the mask between the first image and the second image. A mask region therefore set over the first image covers a portion of the second image. The overlapped portion reveals a visual effect that the third image covers the portion of the second image.

In the method, the process of applying the third image to the second image is performed instantly as to redraw the overall image. The system allows the user to modify the second image at any time. The position, size and angle of the second image are modifiable. The system may anytime have the composited image in combination of the first image and the second image as applying the mask represented by the third image. The process is terminated when the user confirms the final position of the second image, and the composited image is created, such as step S709. The final image is stored to the database 71.

According to one of the embodiments, even though the abovementioned first image is not limited to any specific image, the first image is such as the background image. The second image is therefore the foreground image, and the third image is configured to be the mask image as setting a specific area as the mask. The third image allows the area over the first image to cover an overlapping area between the second image and third image.

Reference is next made to FIG. 8 describing the process for forming the mask image in the method for processing composited images according to one embodiment of the present invention.

The above-mentioned user interface may be the touch screen of a computer system or a specific terminal device. In step S801, a background image is displayed on the touch screen. The user interface allows the user to perform a gesture upon a region of the background image displayed on the touch screen. In step S803, a series of touch signals triggered on the corresponding region is received and processed by the controller of the touch screen so as to determine the mask covering the region, such as in step S805. After that, a mask image is accordingly formed after the user confirms the mask, such as in step S807.

In the step for forming the mask image, in an exemplary example, the mask image is formed responsive to the contour of at least one object of the background image. The mask image is applied to the second image which acts as the foreground image for forming a new foreground image. After combining this new foreground image and the background image, the final composited image visually shows the at least one object masks the foreground image. Further, the method also allows the user to configure multiple masks at different positions over the background image. The composited image therefore appears as the visual effect with multiple layers.

Thus, in accordance with the embodiments of the present invention, the system provides a mechanism for applying a background image to be with one or more masks that are used to mask a foreground image for implementing a visual effect. It is different from the way of cutting the foreground to fit in the background in the prior methods. The system in accordance with the present invention is operated in a computer system of a device having a processor and a memory. The invention is further related to the instructions stored in the memory, and the instructions are executed by the processor for implementing the process described in the FIG. 6 through FIG. 9.

It is intended that the specification and depicted embodiment be considered exemplary only, with a true scope of the invention being determined by the broad meaning of the following claims.

What is claimed is:

1. A method for processing composited images, comprising:
retrieving at least two images from a computer system;
setting a first image and a second image from the at least two images, and displaying the first image and the second image on a touch screen, wherein the first image and the second image are static images or an animation;
configuring at least one mask covering an area over the first image using the touch screen when receiving a series of touch signals corresponding to the area responsive to using a gesture operated over the touch screen, so as to form a third image indicative of at least one range of the at least one mask, wherein the at least one mask set over the first image includes one or more mask images that allow the second image to have one or more masked regions; and
combining the first image and the second image as applying the at least one mask between the first image and the second image for allowing the area over the first image to cover an overlapping area between the second image and the third image so as to redraw a new second image being stored in a memory of the computer system, so as to form a composited image.

2. The method as recited in claim 1, wherein the second image is a static image or an animation which is adjustable in the image's position, size, and/or orientation.

3. A method for processing composited images, applied to a computer system, comprising:
acquiring at least two images retrieved from a memory of the computer system;
setting a background image and a foreground image from the at least two images, wherein the background image and the foreground image are static images or an animation;
using a touch screen displaying the background image to generate a series of touch signals covering at least one area through a gesture over the touch screen, so as to form at least one mask image indicative of at least one range of the at least one mask, wherein the at least one mask image set over the background image allows the foreground image to have one or more masked regions; and
combining the background image and the foreground image as applying the at least one mask image between the background image and the foreground image; wherein, the at least one mask image allows the at least one area over the background image to cover an overlapping area between the foreground image and mask image so as to redraw a new foreground image being in the memory of the computer system so as to form a composited image.

4. The method as recited in claim 3, wherein, using a selection tool displayed on the touch screen to set the background and the foreground, to configure the mask image on the background image,
and to receive touch signals covering the at least one area through the gesture over the touch screen, thereby the at least one mask image is formed and buffered in the memory.

5. The method as recited in claim 3, wherein the mask image is formed responsive to a contour of at least one object of the background image, and the mask image is applied to the foreground image so as to form the new foreground image; the composited image appears that at least one object of the background image visually covers the foreground when the new foreground image is composited on the background image.

6. The method as recited in claim 5, wherein the foreground image is the static image or the animation which is adjustable in the image's position, size, and/or orientation.

7. The method as recited in claim 5, wherein the gesture is operated to wipe the area along the contour of the at least one object of the background image which is displayed on the touch screen, and the touch screen generates touch signals covering the area in response to the wiping operation.

8. A system for processing composited images, having a processor and a memory in a computer system, and an instruction set that is stored in the memory and executed by the processor for:
acquiring at least two images from the computer system;
setting a first image and a second image from the at least two images, wherein the first image and the second image are static images or an animation;
displaying the first image and the second image on a touch screen;
configuring at least one mask covering at least one area of the first image using the touch screen when receiving a series of touch signals corresponding to the area responsive to using a gesture operated over the touch screen, wherein the at least one mask set over the first image includes one or more mask images that allow the second image to have one or more masked regions;
forming a third image indicative of the at least one mask; and
combining the first image and the second image, as applying the at least one mask image for forming a composited image, wherein the at least one mask image allows the at least one area over the first image to cover an overlapping area between the second image and the third image so as to redraw a new second image being stored in the memory of the computer system.

* * * * *